United States Patent [19]

Sliger et al.

[11] Patent Number: 4,630,770

[45] Date of Patent: Dec. 23, 1986

[54] VALVE CONSTRUCTION AND METHOD OF MAKING THE SAME

[75] Inventors: Boyd P. Sliger, Concord; Joseph P. Wagner, Knoxville, both of Tenn.

[73] Assignee: Robertshaw Controls Company, Richmond, Va.

[21] Appl. No.: 791,378

[22] Filed: Oct. 25, 1985

[51] Int. Cl.⁴ .......................... F16K 51/00; F16K 1/00
[52] U.S. Cl. .................... 236/34.5; 251/117; 251/332
[58] Field of Search ................ 236/34, 34.5; 137/513.5; 251/117, 332

[56] References Cited

U.S. PATENT DOCUMENTS

| | | | |
|---|---|---|---|
| 672,384 | 4/1901 | Marvin | 137/513.5 X |
| 758,822 | 5/1904 | Collins | 251/117 |
| 1,015,142 | 1/1912 | Criswell | 137/513.5 |
| 1,297,446 | 3/1919 | Collins | 251/117 X |
| 2,296,732 | 9/1942 | Oyston et al. | 137/513.5 X |
| 3,247,867 | 4/1966 | Martin | 137/513.5 X |
| 3,454,182 | 7/1969 | Morton | 137/513.5 X |
| 4,022,377 | 5/1977 | Wagner et al. | 236/34.5 |
| 4,091,991 | 5/1978 | Sliger | 236/34.5 |
| 4,257,553 | 3/1981 | Sliger et al. | 236/34.5 |

OTHER PUBLICATIONS

Known to shape valve seat means in relation to the edge of the valve member.

Primary Examiner—William E. Wayner
Attorney, Agent, or Firm—Candor, Candor & Tassone

[57] ABSTRACT

A valve construction and method of making the same are provided, the valve construction having an annular valve seat and a movable valve member for opening and closing the valve seat and being operatively interconnected to a thermal power element that is carried by the valve construction. The valve member has an annular rigid part for engaging the valve seat and has an annular flexible part for also engaging the valve seat at a point upstream of the rigid part, the parts of the valve member being so constructed and arranged that the rigid part moves out of engagement with and away from the valve seat a certain distance before the flexible part moves out of engagement with the valve seat. The flexible part of the valve member has an opening therethrough that is adapted to provide a certain sized fluid flow path through the flexible part of the valve member when the rigid part of the valve member is engaging the valve seat.

18 Claims, 18 Drawing Figures

VALVE CONSTRUCTION AND METHOD OF MAKING THE SAME

BACKGROUND OF THE INVENTION

1. Field of the Invention

This invention relates to a new valve construction and to a new method of making the same.

2. Prior Art Statement

It is known to provide a valve construction having an annular valve seat means and a movable valve member for opening and closing the valve seat means and being operatively interconnected to a thermal power element that is carried by the valve construction, the valve member having an annular rigid part for engaging the valve seat means and having an annular flexible part for also engaging the valve seat means at a point upstream of the rigid part. The parts of the valve member are so constructed and arranged that the rigid part moves out of engagement with and away from the valve seat means a certain distance before the flexible part moves out of engagement with the valve seat means. For example, see the U.S. patent of Sliger et al, U.S. Pat. No. 4,257,553 as well as FIGS. 1-4 of this application.

It is also known to provide a fixed leak notch in the poppet valve member or the valve seat means of a valve construction to provide a path for air to be dispelled during coolant filling operations of the engine cooling system utilizing such valve construction. For example, see the U.S. patent to Sliger, U.S. Pat. No. 4,091,991.

It is also known to attempt to decrease the rate of coolant flow with increasing temperature after the start-to-open point of a valve construction by shaping the valve seat means in relation to the edge of the valve member.

SUMMARY OF THE INVENTION

It is one feature of this invention to provide a new valve construction of the type that has a valve member comprising a rigid part and a flexible part that are so constructed and arranged that the rigid part moves out of engagement with and away from the valve seat means of the valve construction a certain distance before the flexible part moves out of engagement with the valve seat means.

In particular, it was found according to the teachings of this invention that the flexible part of the valve member of such a valve construction can be provided with an opening means therethrough that is adapted to provide a cetain sized fluid flow path through the flexible part of the valve member when the rigid part of the valve member is engaging the valve seat means and that such opening means can be utilized for various purposes.

For example, it has been found that such opening means can be combined with an opening means through the rigid part of the valve member to provide a leak path for air to be dispelled during a coolant filling operation.

Therefore, one embodiment of this invention provides a valve construction having an annular valve seat means and a movable valve member for opening and closing the valve seat means and being operatively interconnected to a thermal power element that is carried by the valve construction, the valve member having an annular rigid part for engaging the valve seat means and having an annular flexible part for also engaging the valve seat means at a point upstream of the rigid part. The parts of the valve member are so constructed and arranged that the rigid part moves out of engagement with and away from the valve seat means a certain distance before the flexible part moves out of engagement with the valve seat means. The flexible part of the valve member has opening means therethrough that is adapted to provide a certain sized fluid flow path through the flexible part of the valve member when the rigid part of the valve member is engaging the valve seat means.

It was also found according to the teachings of this invention that such an opening means can cooperate with the pressure drop that is created across the restriction defined by the rigid part of the valve member and the valve seat means as the rigid part moves out of engagement with and away from the valve seat means so as to provide a low rate of coolant flow through the valve seat means after the temperature of the valve construction rises above the start-to-open temperature thereof and before the flexible part moves out of engagement with the valve seat means.

Therefore, another embodiment of this invention provides a valve construction having an annular valve seat means and a movable valve member for opening and closing the valve seat means and being operatively interconnected to a thermal power element that is carried by the valve construction, the valve member having an annular rigid part for engaging the valve seat means and having an annular flexible part for also engaging the valve seat means at a point upstream of the rigid part. The parts of the valve member are so constructed and arranged that the rigid part moves out of engagement with and away from the valve seat means a certain distance before the flexible part moves out of engagement with the valve seat means. The flexible part of the valve member has opening means therethrough that is adapted to provide a certain sized fluid flow path through the flexible part of the valve member when the rigid part of the valve member is in a position to be just out of engagement with the valve seat means and the flexible part of the valve member is still in engagement with the valve seat means. The opening means also provides a fluid flow path through the flexible part of the valve member that increases in size from the certain size thereof as the rigid part of the valve member moves from the position to be just out of engagement with the valve seat through the certain distance thereof.

Accordingly, it is an object of this invention to provide a new valve construction having one or more of the novel features of this invention as set forth above or hereinafter shown or described.

Another object of this invention is to provide a new method of making such a valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a valve construction for use in the coolant system of an internal combustion engine, it is to be understood that the various features of this invention can be utilized singly or in various combinations thereof to provide valve constructions for other uses as desired.

Therefore, this invention is not to be limited to only the embodiments illustrated in the drawings, because the drawings are merely utilized to illustrate one of the wide variety of uses of this invention.

A prior known automobile type valve construction is generally indicated by the reference numeral 20 in FIGS. 1-4 and will be first generally described in order to fully point out the new features being provided by the valve constructions of this invention that are generally indicated respectively by the reference numeral 20A in FIGS. 5-10, the reference numeral 20B is FIGS. 11-16 and by the reference numeral 20C in FIG. 18 and which will later be described, the thermostat construction or valve construction 20 being fully illustrated, described and claimed in the aforementioned U.S. Pat. No. 4,257,553 whereby this patent is being incorporated into this disclosure by this reference thereto.

Figure 1:
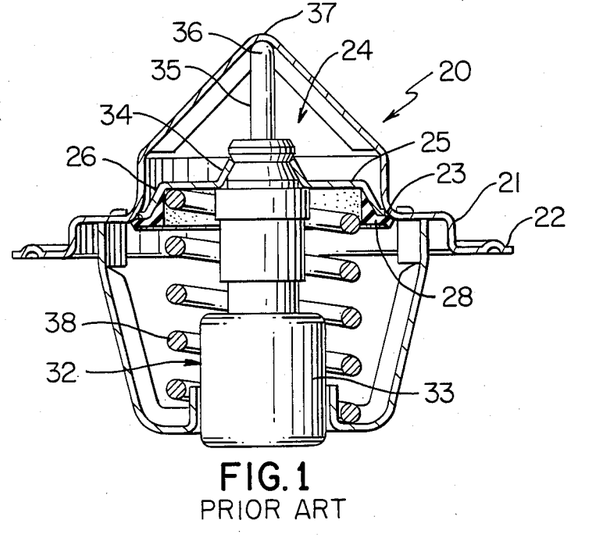
FIG. 1 is a cross-sectional view of a prior known valve construction, such as the valve construction of the aforementioned U.S. Pat. No. 4,257,553.
Figure 2:
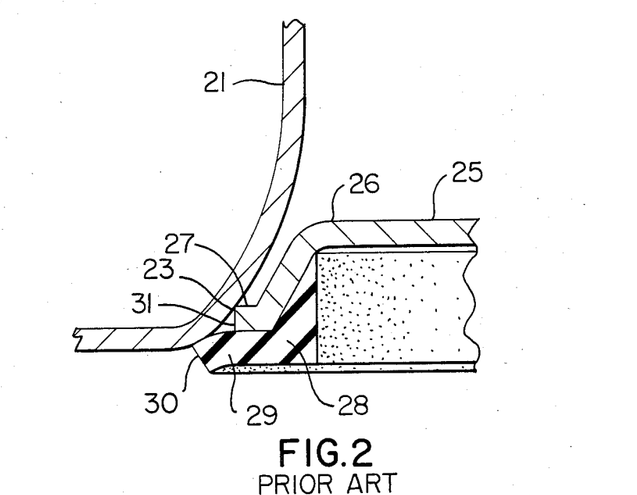
FIG. 2 is an enlarged fragmentary cross-sectional view of the valve construction of FIG. 1 and illustrates the valve member in its fully closed position.
Figure 4:
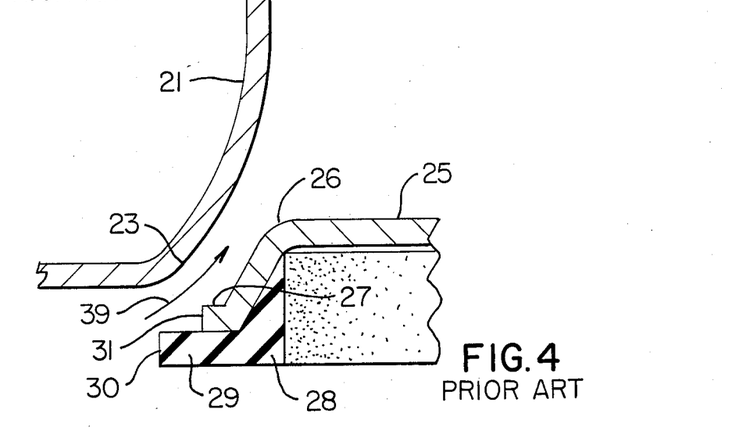
FIG. 4 is a view similar to FIG. 2 and illustrates the valve member in a fully open position thereof.
Figure 5:
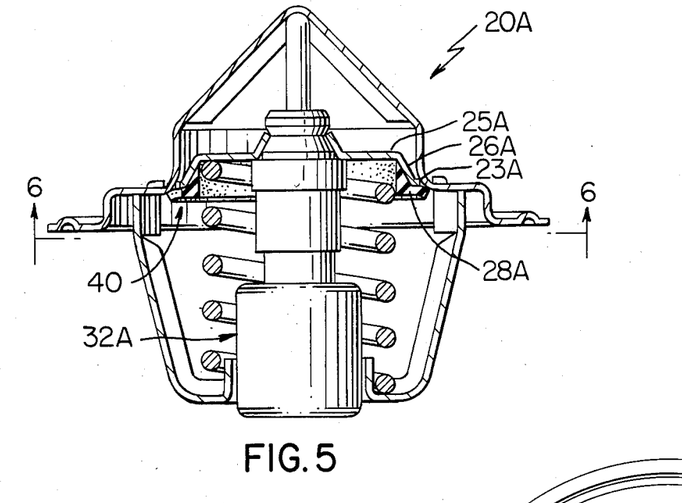
FIG. 5 is a view similar to FIG. 1 and illustrates one embodiment of the new valve construction of this invention.
Figure 6:
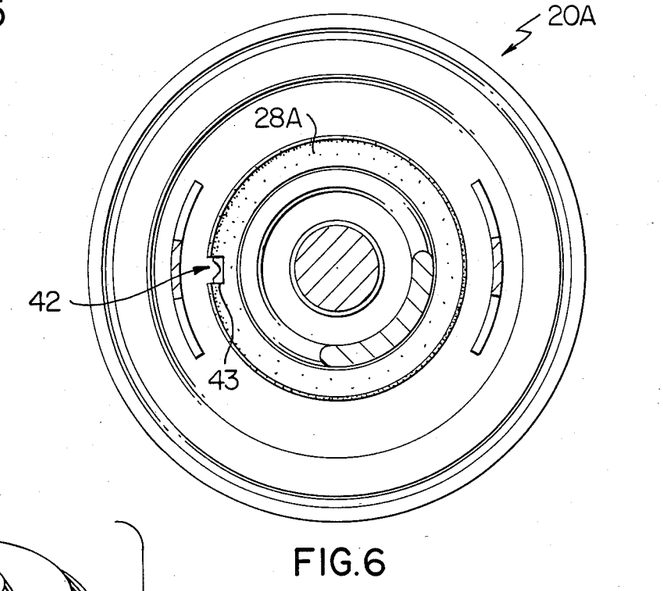
FIG. 6 is an enlarged fragmentary cross-sectional view taken on line 6—6 of FIG. 5.

The valve construction 20 comprises a metallic flange member 21 having an outwardly directed peripheral portion 22 for being clamped in a coolant passage means (not shown) of the coolant system (not shown) of an internal combustion engine (not shown) of a vehicle (not shown) so that coolant fluid must pass upwardly in FIG. 1 through a valve seat portion or means 23 of the flange member 21 and out through an opening means 24 thereof when a movable valve member 25 of the valve construction 20 is disposed in an open condition as illustrated in FIG. 4, the movable valve member 25 comprising a substantially cup-shaped metallic part 26 having an outer annular peripheral edge means 27 adapted to engage against the valve seat portion 23 of the stationary flange member 21 to close the valve seat means 23 in the manner illustrated in FIG. 2.

The valve member 25 also comprises a flexible part 28 of any suitable polymeric material and is carried by the metallic part 26 in any suitable manner, such as being molded thereto, the flexible part 28 having an outer annular peripheral edge means 29 provided with an annular end surface 30 that is disposed radially outwardly beyond an annular end surface 31 of the edge means 27 of the metallic part 26 whereby the outer edge means 29 of the flexible part 28 is also adapted to engage against the valve seat means 23 at a point upstream from the point where the metallic part 26 engages the valve seat means as fully illustrated in FIG. 2.

Figure 3:
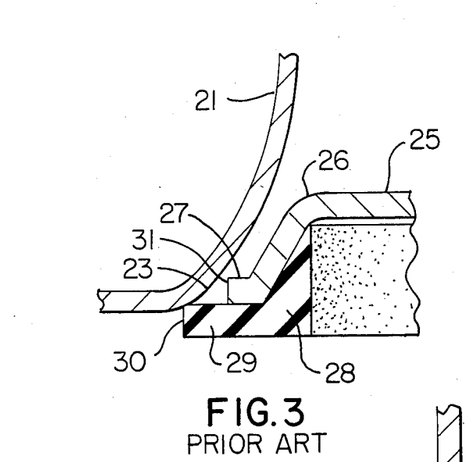
FIG. 3 is a view similar to FIG. 2 and illustrates the valve member in a position thereof where the rigid part of the valve member has moved away from the valve seat means and the flexible part is still in engagement with the valve seat means.

A conventional piston and cylinder type of thermal power element that is generally indicated by the reference numeral 32 has its cylinder 33 secured to an inner peripheral portion 34 of the valve member 25 while a piston or stem 35 thereof has its free end 36 bearing against an apex portion 37 of the flange means 21 so that upon expansion of a petroleum based wax material contained within the cylinder 32 through the heating thereof, the cylinder 33 will be moved downwardly relative to the piston 35 from the position illustrated in FIGS. 1 and 2 to the position illustrated in FIG. 4 in opposition to the force of a compression spring 38 to open the valve member 25 away from the valve seat means 23 to permit coolant fluid to pass through the valve construction 20 as represented by the arrow 39 in FIG. 3 and for a purpose well known in the art.

However, upon subsequent cooling of the wax charge in the thermal power element 32, such wax charge contracts and thereby permits the force of the compression spring 38 to move the cylinder 33 upwardly relative to the piston 35 and, thus, move the valve member 25 upwardly from its open position illustrated in FIG. 4 to its closed position as illustrated in FIG. 2, the closing of the valve member 25 under the force of the compression spring 38 first causing the peripheral edge portion 29 of the flexible part 28 of the valve member 25 to engage against the valve seat means 23 before the metallic part 26 has its surface means 31 engage against the valve seat 23 as illustrated in FIG. 3. However, since the flexible part 28 is arranged so that the peripheral edge means 29 thereof will flex, the metallic part 26 is adapted to subsequently fully seat against the valve seat means 23 in the manner illustrated in FIG. 2 to close the valve seat means 23. At this time, the flexible member 28 also is engaging against the valve seat means 23 so as to seal the same completely around the periphery of the metallic part 26 to substantially reduce any leakage through the valve seat means 23 that might be caused by defects, such as out of roundness, etc. between the parts 26 and 23.

It can be seen that when the valve member 25 of the valve construction 20 is initially being moved in an opening direction from its fully closed position illustrated in FIG. 2, the end surface 31 of the metallic part 26 will first move out of engagement and away from the valve seat 23 before the end edge means 29 of the flexible part 28 moves out of engagement with the valve seat means 23 as illustrated in FIG. 3 so that it is only when the flexible part 28 has returned to its unflexed position as illustrated in FIG. 3 and then is moved out of engagement with the valve seat means 23 that a fluid flow is adapted to pass through the opened valve seat 23 in a manner illustrated in FIG. 4.

It has been found according to the teachings of this invention that this effect of having the rigid part of the valve member first move out of engagement with and away from the valve seat means a certain distance before the flexible part moves out of engagement with the valve seat means can be utilized for a unique purpose as will be hereinafter set forth.

In particular, one embodiment of this invention comprises the valve construction 20A illustrated in FIGS. 5-10 and the parts thereof that are similar to the parts of the prior known valve construction 20 are indicated by like reference numerals followed by the reference letter "A".

Figure 7:
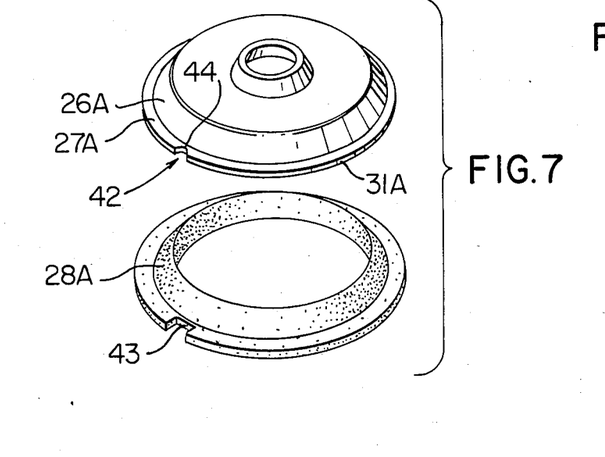
FIG. 7 is an enlarged perspective view of the rigid part and the flexible part of the valve member of the valve construction of FIG. 5.
Figure 8:
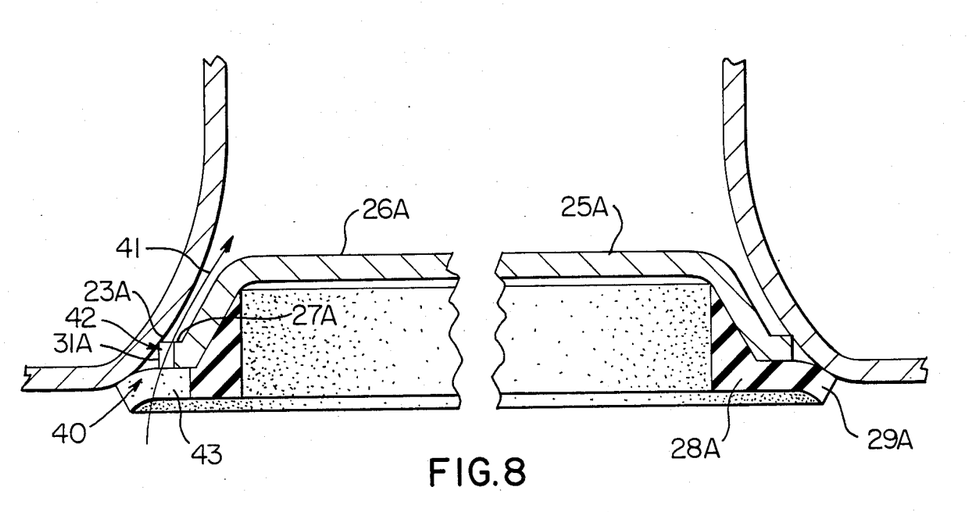
FIG. 8 is an enlarged fragmentary cross-sectional view illustrating the valve member and valve seat of the valve construction of FIG. 4 with the valve member in its fully closed position.

As illustrated in FIGS. 5-10, it can be seen that the new valve construction 20A of this invention is substantially identical to the valve construction 20 previously described except that the same has a leak passage 40 that is provided through the valve member 25A thereof when the metallic part 26A has its outer peripheral edge means 27A fully seated against the valve seat means 23A in the manner illustrated in FIG. 8, such flow passage 40 permitting a certain amount of fluid flow, as represented by the arrow 41 in FIG. 8, to take place for the aforementioned purpose of permitting air to be dispelled through the valve construction 20A during a coolant filling operation so that the engine cooling system can be completely filled with coolant for the reasons fully set forth in the aforementioned U.S. patent to Sliger, U.S. Pat. No. 4,091,991, whereby this patent is being incorporated into this disclosure by this reference thereto so that a further description of the structure and use of a leak passage is not necessary as the same is well known in the art.

The particular leak passage 40 of this invention is provided by forming an opening means 42 through the peripheral edge means 27A of the rigid part 26A of the valve member 25A and to also provide an opening means 43 through the outer peripheral edge means 29A of the flexible part 28A of the valve member 25A, the opening 43 being aligned with the opening 42 as illustrated.

While the openings 42 and 43 can be of any suitable configuration, the opening 42 illustrated in the drawings comprises a generally arcuately shaped notch that interrupts the end surface 31A of the peripheral edge means 27A of the rigid part 26A while the opening 43 comprises a larger generally rectangularly shaped notch that interrupts the end surface 30A of the edge means 29A of the flexible part 28A and extends radially inwardly therein not only beyond the end surface 31A of the metallic part 26A, but also radially inwardly beyond the innermost part 44 of the opening 42 as illustrated in FIG. 7.

With such an arrangement, it was found according to the teachings of this invention that when the metallic part 26A of the valve member 25A is disposed in the seated position illustrated in FIG. 8 wherein the end surface 31A thereof is in full engagement with the valve seat means 23A, the size of the opening 42 determines the size of the leakage flow path 41 through the valve member 25A of the valve construction 20A because the opening 43 in the flexible part 28A is larger than the opening 42.

Figure 9:
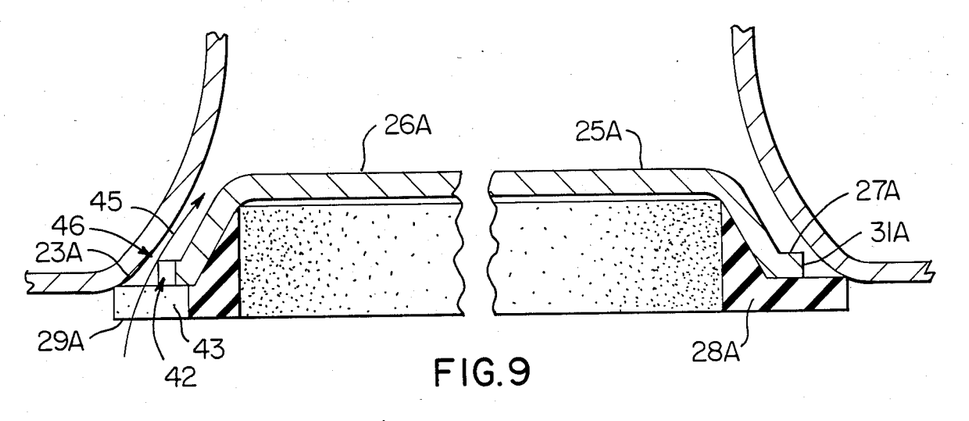
FIG. 9 is a view similar to FIG. 8 and illustrates the valve member in a position thereof where the rigid part of the valve member has moved away from the valve seat means and the flexible part of the valve member is still in engagement with the valve seat means.
Figure 10:
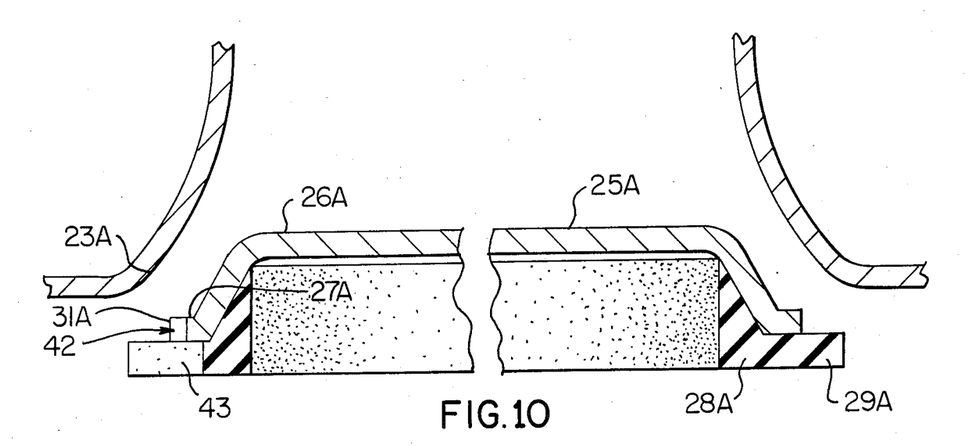
FIG. 10 is a view similar to FIGS. 8 and 9 and illustrates the valve member in its fully opened position.
Figure 11:
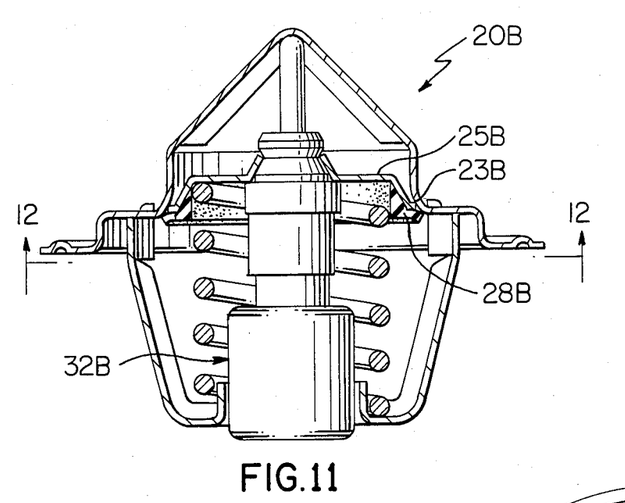
FIG. 11 is a view similar to FIG. 5 and illustrates another embodiment of the new valve construction of this invention.
Figure 12:
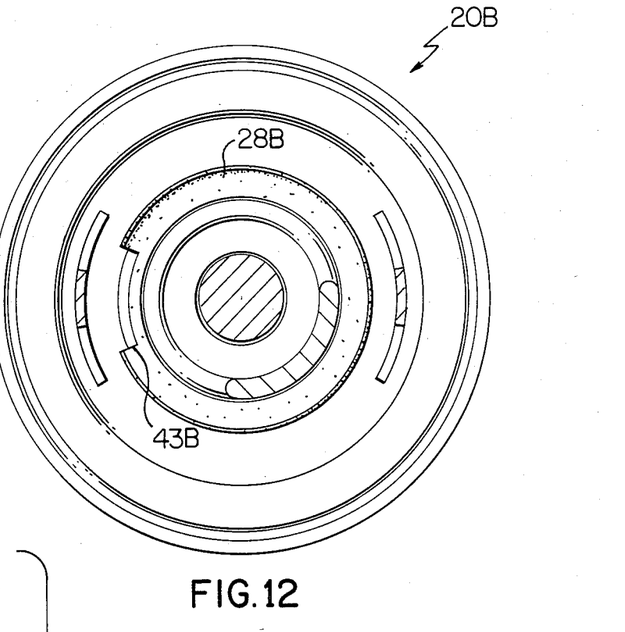
FIG. 12 is an enlarged cross-sectional view taken on line 12—12 of FIG. 11.
Figure 13:
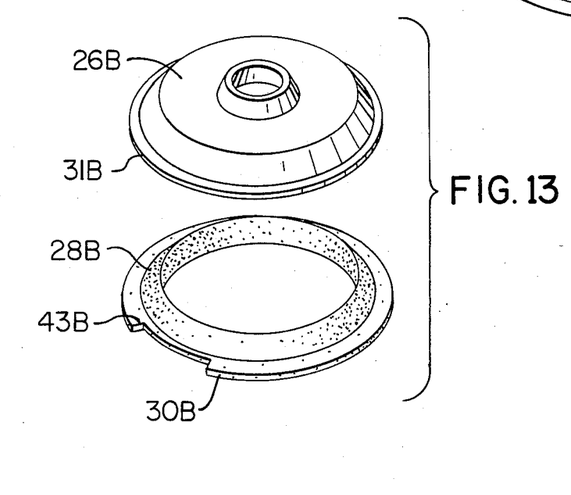
FIG. 13 is an exploded perspective view of the rigid part and the flexible part of the valve member of the valve construction of FIG. 11.

However, it was also found according to the teachings of this invention that as the valve member 25A is moving away from the valve seat 23A from the fully closed position of FIG. 8 toward the position illustrated in FIG. 9, the resulting flow path is provided through the opening 43 in the flexible part 28A, as represented by the arrow 45 in FIG. 9, is controlled mainly by the effective size of the opening 43 and the effective size of the resulting restriction defined by the gap 46 that is provided between the metallic part 26A and the valve seat means 23A as illustrated in FIG. 9 because the flexible part 29A of the valve member 25A is still in engagement with the valve seat means 23A as illustrated in FIG. 9. This unique control of the fluid flow through the valve member 25A as the valve member 25A is being initially moved in the opening direction away from the valve seat means 23A from the position illustrated in FIG. 8 to the position illustrated in FIG. 9 can be utilized to cause the valve construction of this invention to operate in a unique manner.

In particular, it is well known that flow through engine cooling system valve constructions that are operated by wax charge power elements, such as element 32, increases rapidly as the coolant temperature rises above the "start-to-open" temperature and this causes undesirable temperature cycling in engines of recent design.

It is known that to decrease the rate of coolant flow increase with increasing temperature after the start-to-open point, power elements 32 with relatively flat temperature-vs.-stroke output curves can be used. While such power elements can produce the desired gentle flow increase with temperature rise, it has been found that calibration to set the start-to-open point thereof is extremely difficult and, in fact, impractical. For example, if the stem or piston rod of a power element with a wax charge "A" moves approximately 0.001 of an inch per each degree F. change in temperature thereof and with a wax charge "B" it moves approximately 0.005 of an inch per each degree F. change in temperature thereof and you want to hold a start-to-open temperature within + or −2° F., then the position of the stem at the desired start-to-open temperature with the wax "A" would have to be held within + or −0.002 of an inch while with the wax "B" it would have to be held within + or −0.010 of an inch. It has been found that trying to hold the + or −0.002 of an inch results in many rejects and much scrap.

Accordingly, it has been found that it is desirable to utilize power elements with substantial movement per each degree F. change in temperature and produce the desired flow characteristics of the valve construction with a characterized valve.

Therefore, it was found according to the teachings of this invention, that the use of an opening means through the flexible part of the valve member 25 of the prior known valve construction 20 in a manner similar to the opening 43 of the valve construction 20A of this invention in combination with the fact that rigid part 26 of the valve member 25 moves out of engagement and away from the valve seat means 23 a certain distance before the flexible part 28 moves out of engagement with the valve seat means 23 can produce a desired gentle flow increase with temperature rise after the startto-open point of the power element of the valve construction has been reached.

Such new valve construction of this invention is generally indicated by the reference numeral 20B in FIGS. 11-16 and parts thereof similar to the valve constructions 20 and 20A previously described are indicated by like reference numerals followed by the reference letter "B".

As illustrated in FIGS. 11-16, it can be seen that the valve construction 20B is substantially the same as the valve construction 20A previously described except that the rigid part 26B of the valve member 25B does not have the opening 42 disposed therein and the opening 43B in the flexible part 28B of the valve member 25B is substantially larger than the opening 43 but is still defined by a substantially rectangular cutout or notch that interrupts the end surface 30B thereof and extends radially inwardly beyond the end surface 31B of the rigid part 26B.

Figure 14:
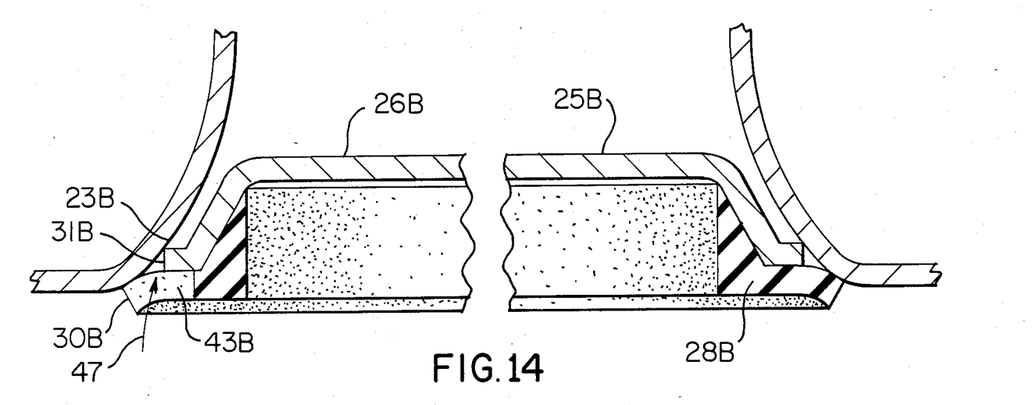
FIG. 14 is an enlarged fragmentary cross-sectional view of the valve member and valve seat means of the valve construction of FIG. 11 and illustrates a valve member in its fully closed position.

In this manner, when the valve member 25B is in its fully closed condition as illustrated in FIG. 14, the end surface 31B of the rigid part 26B of the valve member 25B completely closes the valve seat 23B even though the opening 43B in the flexible part 28B is adpated to provide a certain size fluid flow path through the flexible part 28B of the valve member 25B, such flow path being represented by the arrow 47 in FIG. 14.

This flow path 47 through the opening 43B in the flexible part 28B of the valve member 25B of the valve construction 20B of this invention can be utilized to provide for a leakage flow path through the valve member 25B in the same manner as the leakage flow path 40 of the valve construction 20A previously described if the rigid part 26B of the valve member 25B is also provided with an opening in alignment with the opening 43B.

Figure 18:
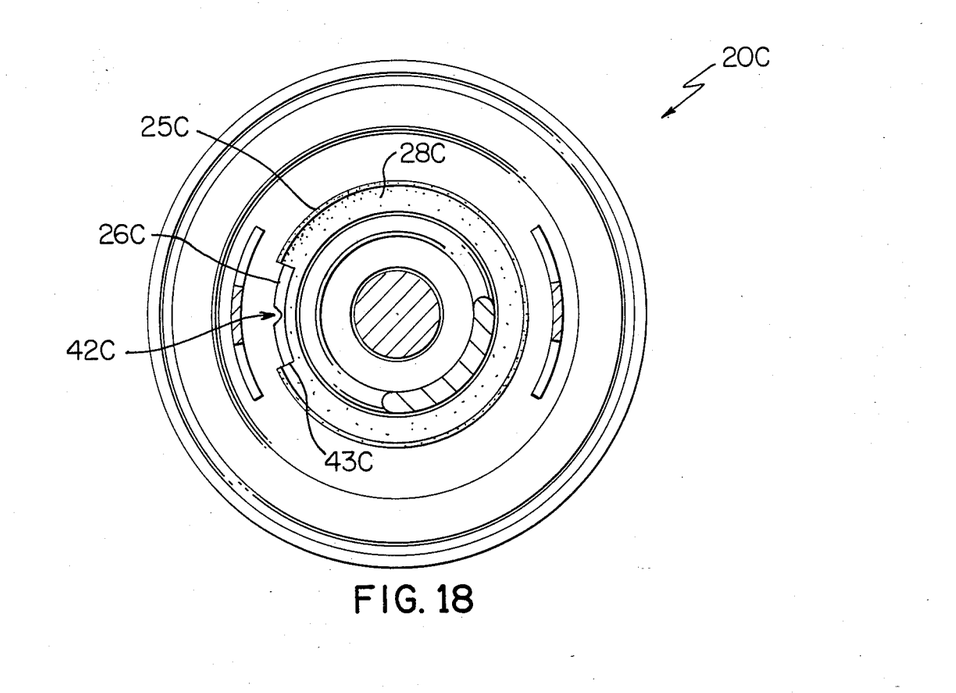
FIG. 18 is a view similar to FIGS. 6 and 12 and illustrates another embodiment of the new valve construction of this invention.

For example, such a valve construction 20C of this invention is illustrated in FIG. 18 wherein parts thereof similar to the valve construction 20B are indicated by like reference numerals followed by the reference letter "C" and it can be seen that the rigid part 26C of the valve member 25C is provided with an opening 42C that is in alignment with the opening 43C of the flexible part 28C to provide for the leakage flow path even though the metallic part 26C of the valve member 25C is fully in engagement with its particular valve seat.

Returning now to FIGS. 14 and 15, it can be seen that as the valve member 25B is being moved from its fully closed position of FIG. 14 toward its partially open condition of FIG. 15 wherein the rigid part 26B of the valve member 25B is moved out of engagement with and away from the valve seat means 23B, the flexible part 28B is remaining in engagement with the valve seat means 23B to prevent any major flow of fluid through the valve construction 20B but a restricted flow path 48' is being created through the valve member 25B and is defined by the opening 43B and the gap 46B between the rigid part 26B and the valve seat means 23B, the flow path 48' providing a certain amount of fluid flow through the valve member 25B that increases from the start-to-open condition to the condition illustrated in FIG. 15 because not only is the effective size of the gap 46B increasing, but also the effective size of the opening 43B is increasing as the peripheral edge means 29B unflexes to its substantially straight or flat condition of FIG. 15.

Figure 15:
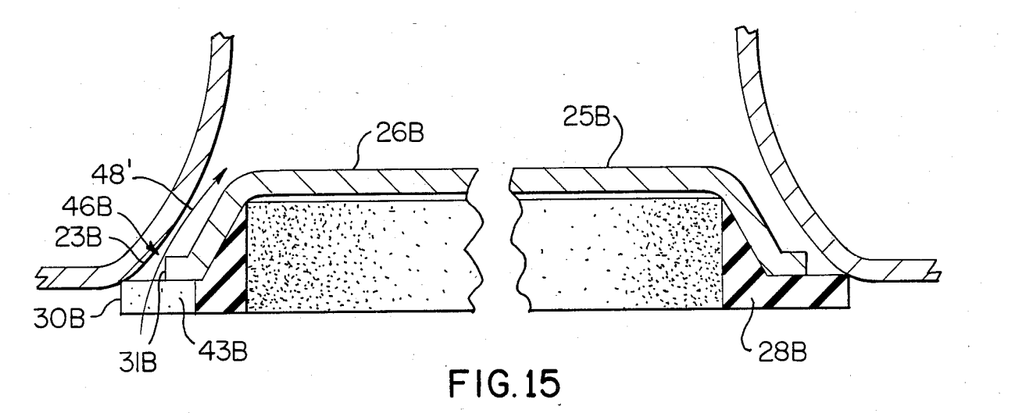
FIG. 15 is a view similar to FIG. 14 and illustrates the valve member in a position thereof where the rigid part of the valve member has moved away from the valve seat means and the flexible part of the valve member is still in engagement with the valve seat means.
Figure 16:
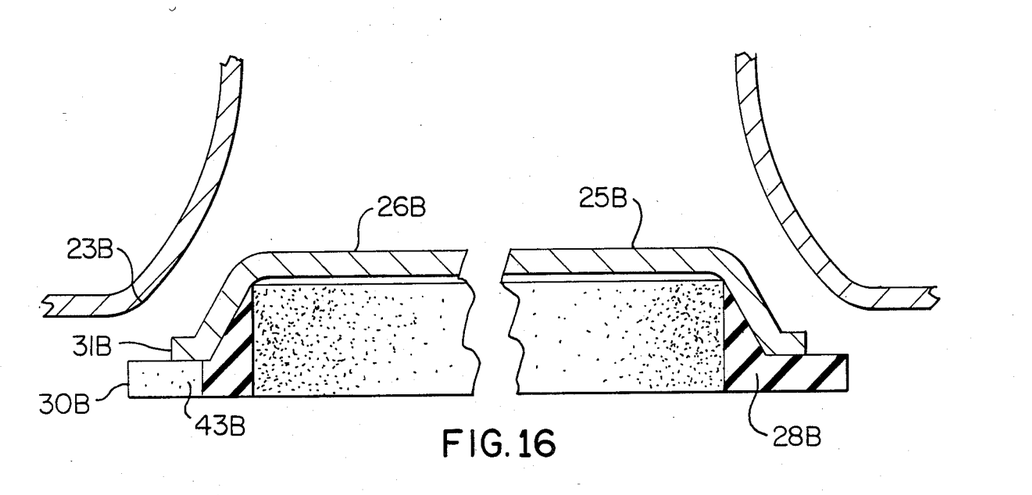
FIG. 16 is a view similar to FIGS. 14 and 15 and illustrates the valve member in its fully opened position.

Further opening of the valve member 25B from the position illustrated in FIG. 15 to the position illustrated in FIG. 16 causes the flexible part 28B to move out of engagement with the valve seat 23B so that the aforementioned restriction 46B no longer exists and normal flow through the valve member 25B takes place.

However, during the movement of the valve member 25B from the position illustrated in FIG. 14 to the position illustrated in FIG. 15, the rate of flow through the valve construction 20B vs. stroke movement of the thermal power element 32B can be tailored at the time the valve construction 20B is being made by varying one or more parts of the structure, such as by varying the size of the opening 43B in the flexible part 28B, the diameter of the peripheral edge means 29B of the flexible part 28B relative to the diameter of the valve seat means 23B, the thickness of the flexible part 28B, the durometer rating of the flexible part 28B, etc.

Figure 17:
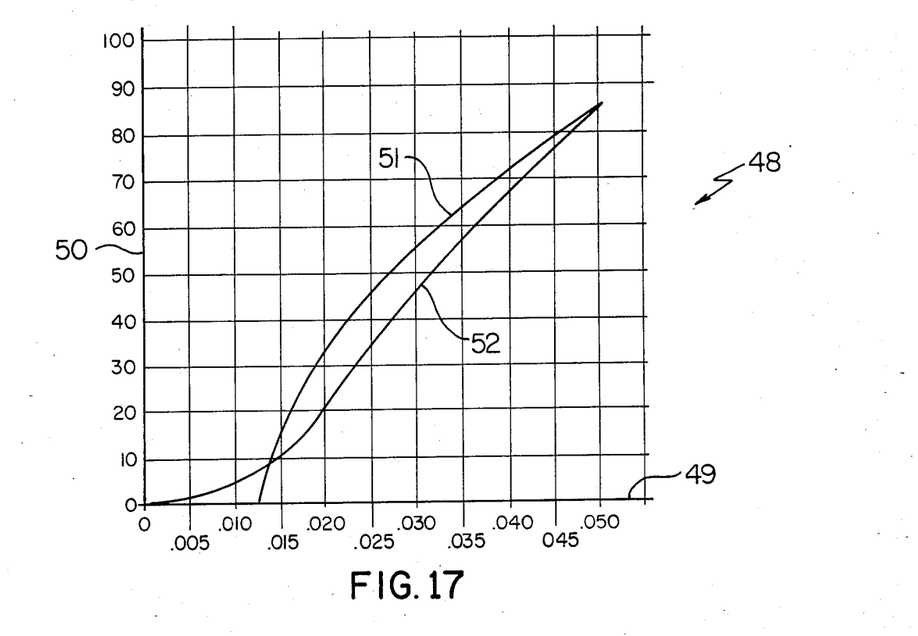
FIG. 17 is a chart or graph that illustrates the flow characteristics of one version of the valve construction of FIG. 11 in comparison with the flow characteristics of one version of the prior known valve construction of FIG. 1.

One such tailored arrangement of a valve construction 20B of this invention provides the flow vs. stroke operation that is represented by the graph 48 in FIG. 17 wherein the X axis 49 represents the stroke of the element 32B in inches and the Y axis 50 represents the fluid flow through the valve construction 20B in gallons per minute.

The curve 51 on the graph 48 represents the operation of the valve construction 20 of FIGS. 1-4 and the curve 52 on the graph 48 represents the use of the same size valve construction 20B of this invention with the same vehicle engine but having the opening 43B in the resilient part 28B thereof as previously described.

Therefore, it can be seen that providing an opening means 43B through the flexible part 28B of the valve member 25B, such opening means 43B is adpated to provide a certain sized fluid flow path 48' through the flexible part 28B of the valve member 25B when the rigid part 26B of the valve member 25B is out of engagement with the valve seat means 23B and the flexible part 28B of the valve member 25B is still in engagement with the valve seat means 23B. Such size of the flow path 48' progressively increases from the initial start-to-open position of the rigid part 26B until the flexible part 28B of the valve member 25B starts to open away from the valve seat means 23B and this is represented by the smooth gradual portion of the curve 52 on the graph 48 as the stroke of the thermal element moves from the start-to-open position of 0.00 to 0.015 and above for the reasons previously set forth.

And as previously described, such characterizing of the valve construction of this invention can still be utilized in combination with a notch 42C in the rigid part 26C to provide a leakage flow path when the rigid part 26C is against the valve seat means of the valve construction 20C of this invention because such notch 42C will not effectively influence the effective size of the restriction gap between the rigid part and the valve seat means as the rigid part is moving out of engagement therewith and while the flexible part is still in engagement with the valve seat as previously described.

Therefore, it can be seen that this invention provides a new valve construction as well as a new method of making such a valve construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a valve construction having an annular valve seat means and a movable valve member for opening and closing said valve seat means and being operatively interconnected to a thermal power element that is carried by said valve construction, said valve member having an annular rigid part for engaging said valve seat means and having an annular flexible part for also engaging said valve seat means at a point upstream of said rigid part, said parts of said valve member being so constructed and arranged that said rigid part moves out of engagement with and away from valve seat means a certain distance before said flexible part moves out of engagement with said valve seat means, the improvement wherein said flexible part of said valve member has opening means therethrough that is adapted to provide a certain sized fluid flow path through said flexible part of said valve member when said rigid part of said valve member is in a position to be just out of engagement with said valve seat means and said flexible part of said valve member is still in engagement with said valve seat means, said opening means providing a fluid flow path through said flexible part of said valve member that increases in size from said certain size thereof as said rigid part of said valve member moves from said position to be just out of engagement with said valve seat through said certain distance thereof.

2. A valve construction as set forth in claim 1 wherein said flexible part of said valve member has an annular peripheral outer edge means that extends outwardly beyond said rigid part, said opening means being disposed in said outer edge means of said flexible part.

3. A valve construction as set forth in claim 2 wherein said outer edge means of said flexible part of said valve member has an annular outer end surface, said opening means interrupting said outer end surface.

4. A valve construction as set forth in claim 3 wherein said rigid part has an annular peripheral outer edge means provided with an annular outer end surface, said opening means extending inwardly beyond said outer end surface of said rigid part.

5. A valve construction as set forth in claim 2 wherein said rigid part has an annular peripheral outer edge means provided with an outer end surface that is adapted to engage said valve seat means and is disposed radially inwardly in spaced relation to said outer end surface of said flexible part.

6. A valve construction as set forth in claim 5 wherein said outer peripheral edge means of said rigid part of said valve member has an opening means therethrough that is aligned with said opening means of said flexible part thereof whereby a certain size flow path is provided through said aligned opening means when said outer end surface of said rigid part is engaging said valve seat means.

7. A valve construction as set forth in claim 6 wherein said opening means of said rigid part of said valve member interrupts said end surface thereof.

8. A valve construction as set forth in claim 6 wherein said opening means of said flexible part of said valve member is larger than said opening means of said rigid part of said valve member.

9. A valve construction as set forth in claim 8 wherein said outer edge means of said flexible part of said valve member has an annular outer end surface, said opening means interrupting said outer end surface of said flexible part of said valve member.

10. In a method of making a valve construction having an annular valve seat means and a movable valve member for opening and closing said valve seat means and being operatively interconnected to a thermal power element that is carried by said valve construction, said method comprising the steps of forming said valve member to have an annular rigid part for engaging said valve seat means and to have an annular flexible part for also engaging said valve seat means at a point upstream of said rigid part, and constructing and arranging said parts of said valve member so that said rigid part moves out of engagement with and away from said valve seat means a certain distance before said flexible part moves out of engagement with said valve seat means, the improvement comprising the step of forming an opening means through said flexible part of said valve member so that said opening means is adapted to provide a certain sized fluid flow path through said flexible part of said valve member when said rigid part of said valve member is in a position to be just out of engagement with said valve seat means and said flexible part of said valve member is still in engagement with said valve seat means and so that said opening means is adapted to provide a fluid flow path through said flexible part of said valve member that increases in size from said certain size thereof as said rigid part of said valve member moves from said position to be just out of engagement with said valve seat through said certain distance thereof.

11. A method of making a valve construction as set forth in claim 10 and including the steps of forming said flexible part of said valve member to have an annular peripheral outer edge means that extends outwardly beyond said rigid part and forming said opening means to be disposed in said outer edge means of said flexible part.

12. A method of making a valve construction as set forth in claim 11 and including the steps of forming said outer edge means of said flexible part of said valve member to have an annular outer end surface, and forming said opening means to interrupt said outer end surface.

13. A method of making a valve construction as set forth in claim 12 and including the steps of forming said rigid part of said valve member to have an annular peripheral outer edge means provided with an annular outer end surface, and forming said opening means to extend inwardly beyond said outer end surface of said rigid part.

14. A method of making a valve construction as set forth in claim 11 and including the step of forming said rigid part of said valve member to have an annular peripheral outer edge means provided with an outer end surface that is adapted to engage said valve seat means and is disposed radially inwardly in spaced relation to said outer end surface of said flexible part.

15. A method of making a valve construction as set forth in claim 14 and including the step of forming said outer peripheral edge means of said rigid part of said valve member to have an opening means therethrough that is aligned with said opening means of said flexible part thereof whereby a certain sized flow path is provided through said aligned opening means when said outer end surface of said rigid part is engaging said valve seat means.

16. A method of making a valve construction as set forth in claim 15 and including the step of forming said opening means of said rigid part of said valve member to interrupt said end surface thereof.

17. A method of making a valve construction as set forth in claim 15 and including the step of forming said opening means of said flexible part of said valve member to be larger than said opening means of said rigid part of said valve member.

18. A method of making a valve construction as set forth in claim 17 and including the steps of forming said outer edge means of said flexible part of said valve member to have an annular outer end surface, and forming said opening means to interrupt said outer end surface of said flexible part of said valve member.

* * * * *